US009971035B2

(12) United States Patent
Imaki et al.

(10) Patent No.: US 9,971,035 B2
(45) Date of Patent: May 15, 2018

(54) WIND MEASUREMENT LIDAR (71) Applicant: MITSUBISHI ELECTRIC CORPORATION, Tokyo (JP)

(72) Inventors: Masaharu Imaki, Tokyo (JP); Nobuki Kotake, Tokyo (JP); Shumpei Kameyama, Tokyo (JP); Toshiyuki Ando, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 254 days.

(21) Appl. No.: 15/022,021

(22) PCT Filed: Oct. 11, 2013

(86) PCT No.: PCT/JP2013/077793
§ 371 (c)(1),
(2) Date: Mar. 15, 2016

(87) PCT Pub. No.: WO2015/052839
PCT Pub. Date: Apr. 16, 2015

(65) Prior Publication Data
US 2016/0223674 A1    Aug. 4, 2016

(51) Int. Cl.
*G01P 3/36* (2006.01)
*G01S 17/58* (2006.01)
(Continued)

(52) U.S. Cl.
CPC ........... *G01S 17/58* (2013.01); *G01P 5/26* (2013.01); *G01S 7/4876* (2013.01); *G01S 7/497* (2013.01); *G01S 17/95* (2013.01); *Y02A 90/19* (2018.01)

(58) Field of Classification Search
CPC ........ G01S 17/58; G01S 17/95; G01S 7/4876; G01S 7/497; G01P 5/26
(Continued)

(56) References Cited

U.S. PATENT DOCUMENTS 6,285,288 B1 *  9/2001  Langdon ............... B64D 43/00
                                                340/603
7,679,729 B2 *  3/2010  Ando ...................... G01P 5/26
                                                356/28

(Continued)

FOREIGN PATENT DOCUMENTS

JP    2001-074842 A    3/2001
JP    2001-166043 A    6/2001
(Continued)

OTHER PUBLICATIONS

The extended European search report issued by the European Patent Office dated May 15, 2017, which corresponds to European Patent Application No. 13895308.8-1812 and is related to U.S. Appl. No. 15/022,021.

(Continued)

*Primary Examiner* — Mark Hellner
(74) *Attorney, Agent, or Firm* — Studebaker & Brackett PC (57) ABSTRACT

A wind measurement lidar includes: an output unit to output a laser beam; a transmitter-receiver to emit the laser beam produced by the output unit into the air, and to receive a scattered beam of the laser beam; a received signal acquiring unit to obtain a received signal through heterodyne detection of the laser beam and the beam acquired via the transmitter-receiver; a controller to control the transmitter-receiver; a storage to store as a noise signal the received signal obtained when the laser beam is controlled so as to be produced, but not to be emitted into the air; a frequency difference unit to subtract the noise signal from the received signal obtained when the laser beam is controlled so as to be emitted into the air; and a wind speed measurer to measure a wind speed from the subtraction result.

2 Claims, 9 Drawing Sheets (51) Int. Cl.
    *G01S 17/95*   (2006.01)
    *G01P 5/26*    (2006.01)
    *G01S 7/497*   (2006.01)
    *G01S 7/487*   (2006.01)
(58) Field of Classification Search
    USPC .......................................................... 356/28
    See application file for complete search history.

(56) References Cited

U.S. PATENT DOCUMENTS

| | | |
|---|---|---|
| 2003/0142287 A1 | 7/2003 | Ohishi et al. |
| 2004/0041725 A1 | 3/2004 | Matsuda et al. |
| 2005/0213074 A1 | 9/2005 | Hoashi |
| 2007/0058156 A1 | 3/2007 | Ando et al. |
| 2012/0206712 A1 | 8/2012 | Chang et al. |
| 2013/0088705 A1 | 4/2013 | Asahara et al. |

FOREIGN PATENT DOCUMENTS

| | | |
|---|---|---|
| JP | 2003-185747 A | 7/2003 |
| JP | 2005-274413 A | 10/2005 |
| JP | 2009-162678 A | 7/2009 |
| JP | 2013-083467 A | 5/2013 |

OTHER PUBLICATIONS

Office Action issued by the Chinese Patent Office dated Feb. 28, 2017, which corresponds to Chinese Patent Application No. 201380080122.X and is related to U.S. Appl. No. 15/022,021; with English language partial translation.
International Search Report—PCT/JP2013/077793 dated Nov. 19, 2013.

\* cited by examiner

– – – Noise Spectrum Stored in Advance

WIND MEASUREMENT LIDAR

TECHNICAL FIELD

The present invention relates to a wind measurement lidar capable of measuring noise at a time of laser beam oscillation accurately.

BACKGROUND ART

A common wind measurement lidar emits single-frequency continuous-wave light (laser beam) called a local beam into the air, first, and receives a scattered beam from aerosol. Then, it obtains a received signal through heterodyne detection between the laser beam and the scattered beam. The received signal is passed through FFT processing to obtain its peak frequency from which a frequency shift amount due to the movement of the aerosol is calculated. From the frequency shift amount, it measures the wind speed (the degree of turbulence of the wind field) in the direction of the laser emission. At this time, the level of a noise spectrum at the time of the frequency shift analysis varies owing to power fluctuation of the laser beam, or temperature fluctuation of an optical receiver that carries out the heterodyne detection. In view of this, a Patent Document 1, for example, describes a removal method of the noise offset.

A wind measurement lidar disclosed in the Patent Document 1 stores a signal spectrum in advance, which is acquired in a state without emitting a laser beam, as a noise spectrum. Then, taking a frequency difference of the noise spectrum from the signal spectrum acquired in the state without emitting the laser beam, followed by making an offset correction, it detects a frequency peak position of the signal spectrum, and obtains the frequency shift amount.

PRIOR ART DOCUMENT

Patent Document

Patent Document 1: Japanese Patent Laid-Open No. 2009-162678.

DISCLOSURE OF THE INVENTION

Problems to be Solved by the Invention

However, the wind measurement lidar disclosed in the Patent Document 1 measures the noise spectrum in the state without emitting the laser beam. Accordingly, the noise spectrum at a short distance does not include the effect of the shot noise due to the laser beam, which offers a problem of bringing about a difference error and an offset error.

The present invention is implemented to solve the foregoing problems. Therefore it is an object of the present invention to provide a wind measurement lidar capable of carrying out noise correction including the shot noise effect due to the laser beam, thereby achieving the wind speed measurement without a correction error.

Means for Solving the Problem

A wind measurement lidar in accordance with the present invention comprises: an output unit to produce a laser beam; a transmitter-receiver to emit the laser beam produced by the output unit into the air, and to receive a scattered beam of the laser beam; a received signal acquirer to obtain a received signal through heterodyne detection of the laser beam produced from the output unit and a beam acquired via the transmitter-receiver; a controller to control the transmitter-receiver; a storage to store, when the laser beam is controlled by the controller so as to be produced, but not to be emitted into the air, the received signal obtained by the received signal acquirer as a noise signal; a frequency difference unit to subtract in a frequency domain the noise signal stored in the storage from the received signal obtained by the received signal acquirer when the laser beam is controlled by the controller so as to be emitted into the air; a wind speed measurer to measure a wind speed from a subtraction result by the frequency difference unit; and a distance origin calibrator to calibrate, when the laser beam is controlled by the controller so as to be produced, but not to be emitted into the air, the received signal obtained by the received signal acquirer as a distance origin, wherein the wind speed measurer measures the wind speed with regard to the distance origin calibrated by the distance origin calibrator.

Advantages of the Invention

According to the present invention, with the configuration as described above, it can make the noise correction including the shot noise effect due to the laser beam, thereby being able to achieve the wind speed measurement without a correction error.

BRIEF DESCRIPTION OF THE DRAWINGS

FIG. 2(a) is a diagram showing a noise spectrum at a long distance; and FIG. 2(b) is a diagram showing a noise spectrum at a short distance;

FIG. 3(a) is a diagram showing noise spectra at a long distance; and FIG. 3(b) is a diagram showing noise spectra at a short distance;

FIG. 7(a) is a diagram showing a received signal when emitting a laser beam into the air; and FIG. 7(b) is a diagram showing a received signal when producing a laser beam, but not emitting the laser beam into the air;

FIG. 9(a) is a diagram showing a received spectrum from an output end surface after noise correction; and FIG. 9(b) is a diagram illustrating a confirmation method of a spectral bandwidth.

BEST MODE FOR CARRYING OUT THE INVENTION

The best mode for carrying out the invention will now be described with reference to the accompanying drawings.

Embodiment 1

Figure 1:
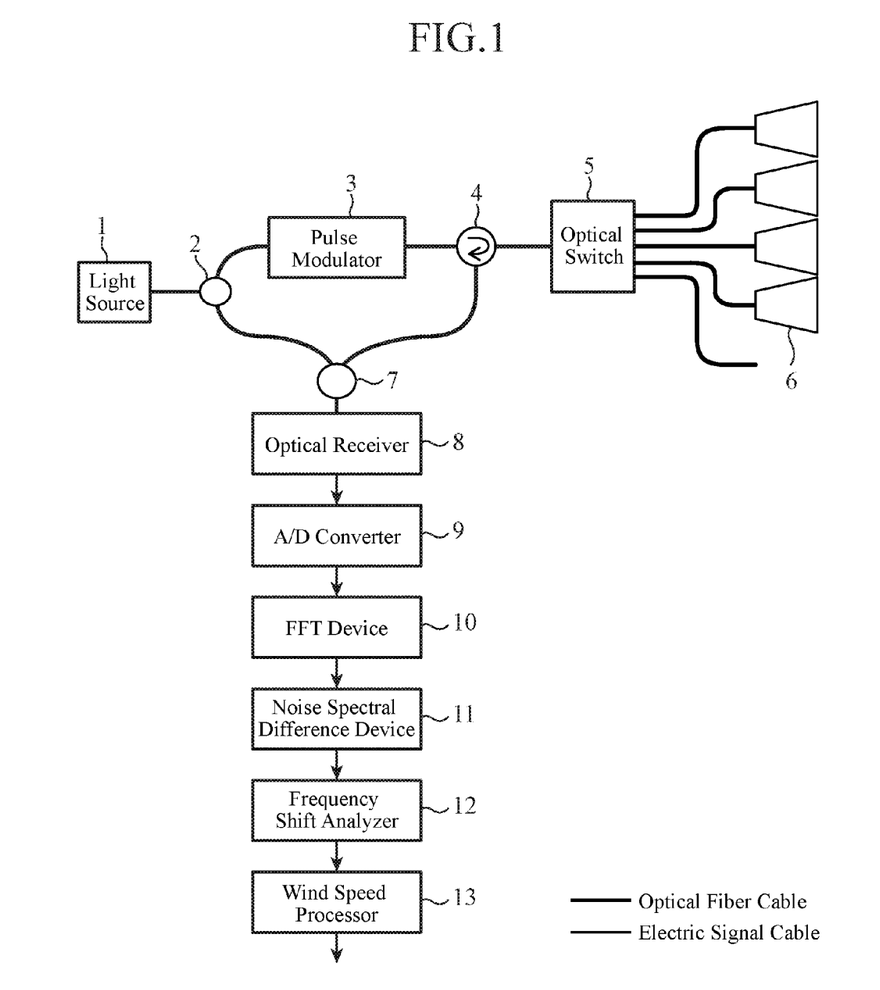
FIG. 1 is a block diagram showing a configuration of a wind measurement lidar of an embodiment 1 in accordance with the present invention.

FIG. 1 is a block diagram showing a configuration of a wind measurement lidar of an embodiment 1 in accordance with the present invention.

As shown in FIG. 1, the wind measurement lidar comprises a light source 1, an optical distributor 2, a pulse modulator 3, an optical circulator 4, an optical switch 5, a plurality of optical antennas 6, an optical coupler 7, an optical receiver 8, an analog-to-digital converter (referred to as "A/D converter" from now on) 9, a fast Fourier analyzer (referred to as "FFT device" from now on) 10, a noise spectral difference device 11, a frequency shift analyzer 12 and a wind speed processor 13.

Incidentally, in FIG. 1, an optical circuit such as an optical fiber cable connects between the light source 1 and the optical distributor 2, between the optical distributor 2 and the pulse modulator 3, between the optical distributor 2 and the optical coupler 7, between the pulse modulator 3 and the optical circulator 4, between the optical circulator 4 and the optical switch 5, between the optical switch 5 and the individual optical antennas 6, between the optical circulator 4 and the optical coupler 7, and between the optical coupler 7 and the optical receiver 8.

In addition, an electric circuit such as an electric signal cable connects between the optical receiver 8 and the A/D converter 9, between the A/D converter 9 and the FFT device 10, between the FFT device 10 and the noise spectral difference device 11, between the noise spectral difference device 11 and the frequency shift analyzer 12, and between the frequency shift analyzer 12 and the wind speed processor 13.

The light source 1 is a component to produce a continuous-wave beam (laser beam) of a single frequency. The laser beam from the light source 1 is output to the optical distributor 2.

The optical distributor 2 splits the laser beam from the light source 1 into two parts. As for the laser beams after the division through the optical distributor 2, one of them is output to the pulse modulator 3, and the other is output to the optical coupler 7.

The pulse modulator 3 is a component to provide the laser beam from the optical distributor 2 with a prescribed frequency shift, and then to provide it with pulse modulation (make a modulation signal consisting of a pulse train with a prescribed pulse width and cycle). The laser beam passing through the pulse modulation by the pulse modulator 3 is output to the optical circulator 4.

The optical circulator 4 is a component to switch the output destination of the beam in accordance with the input source. The optical circulator 4 outputs the laser beam from the pulse modulator 3 to the optical switch 5, and outputs the beam from the optical switch 5 to the optical coupler 7.

The optical switch 5 is a component that has channels connected to the optical antennas 6, respectively, and a channel without any connection with the optical antennas 6, that switches the output destination in response to a control signal from the outside, and that outputs the laser beam from the pulse modulator 3 via the optical circulator 4 to the output destination. Incidentally, as for a configuration of the channel not connected to any of the optical antennas 6, it has its output end surface screened so that when it is selected as the output destination, the laser beam is not emitted into the air.

The optical antennas 6 are components to emit the laser beam from the optical switch 5 into the air, and to concentrate a scattered beam of the laser beam from aerosol. The scattered beam concentrated with the optical antenna 6 is delivered to the optical coupler 7 via the optical switch 5 and optical circulator 4. Incidentally, the optical antennas 6 are each fixed in a predetermined direction so that switching the output destination optical antenna 6 with the optical switch 5 enables switching the emission direction of the laser beam.

The optical coupler 7 is a component to multiplex the laser beam from the optical distributor 2 and the beam from the optical switch 5 side via the optical circulator 4. The beam signal passing through the multiplexing by the optical coupler 7 is output to the optical receiver 8.

Here, when the optical switch 5 selects a channel to which a prescribed optical antenna 6 is connected as the output destination of the laser beam, the optical coupler 7 is provided not only with the scattered beam concentrated with the optical antenna 6, but also with a scattered beam of the laser beam within the system and a reflected beam from the output end surface. On the other hand, when the optical switch 5 selects the channel not connected to any of the optical antennas 6 as the output destination of the laser beam, the optical coupler 7 is provided with the scattered beam of the laser beam within the system or the reflected beam off the output end surface.

The optical receiver 8 is a component to carry out the heterodyne detection of the beam signal from the optical coupler 7, thereby converting the beam signal to an electric signal. The electric signal after the conversion by the optical receiver 8 is output to the A/D converter 9.

The A/D converter 9 is a component to carry out A/D conversion of the electric signal from the optical receiver 8. The electric signal passing through the A/D conversion by the A/D converter 9 is output to the FFT device 10.

The FFT device 10 is a component to carry out frequency analysis of the electric signal from the A/D converter 9 to obtain a signal spectrum. The signal spectrum obtained by the FFT device 10 is output to the noise spectral difference device 11.

The noise spectral difference device 11 comprises a noise spectrum storage 111 and a frequency difference unit 112.

The noise spectrum storage 111 is a component to record the signal spectrum obtained by the FFT device 10 as a noise spectrum in advance, when the optical switch 5 selects the channel not connected to any of the optical antennas 6 as the output destination of the laser beam.

The frequency difference unit 112 is a component to subtract in the frequency domain the noise spectrum stored in the noise spectrum storage 111 from the signal spectrum obtained by the FFT device 10, when the optical switch 5 selects a channel to which the prescribed optical antenna 6 is connected as the output destination of the laser beam.

The signal spectrum passing through the noise correction by the noise spectral difference device 11 (frequency difference unit 112) is output to the frequency analyzer 12.

The frequency shift analyzer 12 is a component to convert the signal spectrum after the noise correction from the noise spectral difference device 11 to a linear region, to calculate a peak frequency by a barycentric operation, and to calculate a frequency shift amount. The frequency shift amount calculated by the frequency shift analyzer 12 is delivered to the wind speed processor 13.

The wind speed processor 13 is a component to calculate the wind speed from the frequency shift amount from the frequency shift analyzer 12. The wind speed calculated by the wind speed processor 13 is delivered to the outside.

Here, the light source 1 and pulse modulator 3 correspond to "an output unit to produce a laser beam" in accordance with the present invention.

In addition, the optical antennas 6 correspond to "a transmitter-receiver to emit the laser beam produced by the output unit into the air, and to receive a scattered beam of the laser beam" in accordance with the present invention.

In addition, the optical receiver 8, the A/D converter 9 and the FFT device 10 correspond to "a received signal acquiring unit to obtain a received signal through heterodyne detection of the laser beam produced from the output unit and a beam acquired via the transmitter-receiver" in accordance with the present invention.

In addition, the optical switch 5 corresponds to "a controller to control the transmitter-receiver" in accordance with the present invention.

In addition, the noise spectrum storage 111 corresponds to "a storage to store, when the laser beam is controlled by the controller so as to be produced, but not to be emitted into the air, the received signal obtained by the received signal acquiring unit as a noise signal" in accordance with the present invention.

In addition, the frequency difference unit 112 corresponds to "a frequency difference unit to subtract in a frequency domain the noise signal stored in the storage from the received signal obtained by the received signal acquiring unit when the laser beam is controlled by the controller so as to be emitted into the air" in accordance with the present invention.

In addition, the frequency shift analyzer 12 and the wind speed processor 13 correspond to "a wind speed measurer to measure a wind speed from a subtraction result by the frequency difference unit" in accordance with the present invention.

Next, the operation of the wind measurement lidar with the foregoing configuration will be described with reference to FIG. 1 to FIG. 3. First, the noise spectrum measurement will be described.

In the noise spectrum measurement by the wind measurement lidar, the light source 1 produces the single-frequency continuous-wave beam (laser beam), first, and the optical distributor 2 splits the laser beam into two parts and outputs them to the pulse modulator 3 and optical coupler 7.

After that, the pulse modulator 3 gives the prescribed frequency shift to the laser beam from the optical distributor 2, followed by the pulse modulation. The laser beam passing through the pulse modulation by the pulse modulator 3 is output to the optical switch 5 via the optical circulator 4.

After that, in response to the control signal from the outside, the optical switch 5 selects the channel not connected to any of the optical antennas 6 as the output destination of the laser beam from the pulse modulator 3, and outputs the laser beam to the output destination. Thus, the laser beam is not emitted into the air, and the optical antennas 6 do not concentrate a scattered beam.

After that, the optical coupler 7 multiplexes the laser beam from the optical distributor 2 and the beam from the optical switch 5 side via the optical circulator 4 (a scattered beam of the laser beam within the system or a reflected beam off the output end surface), and outputs to the optical receiver 8.

After that, the optical receiver 8 carries out the heterodyne detection of the beam signal from the optical coupler 7, and converts it to the electric signal.

Then, the A/D converter 9 carries out the A/D conversion of the received signal from the optical receiver 8, and the FFT device 10 executes the FFT processing of the electric signal to obtain the signal spectrum.

After that, the noise spectrum storage 111 of the noise spectral difference device 11 stores the signal spectrum from the FFT device 10 as a noise spectrum. Thus, as for the signal spectrum obtained when the optical switch 5 selects the channel not connected to any of the optical antennas 6 as the output destination of the laser beam, the noise spectrum storage 111 records it as a noise spectrum.

Incidentally, the noise spectrum to be recorded in advance can be measured at a time resolution corresponding to one shot of the laser beam, or by integrating n times.

Figure 2:
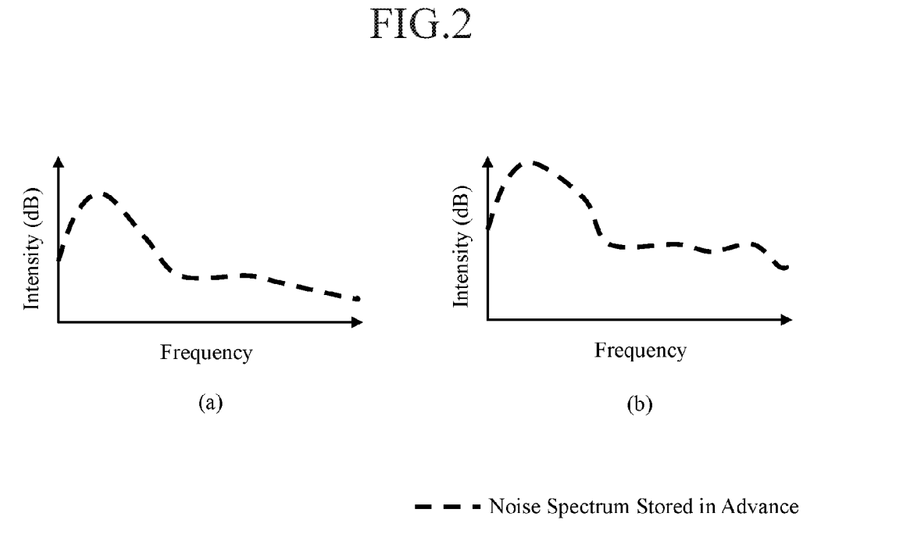
FIG. 2 is a diagram showing an operation of the wind measurement lidar of the embodiment 1 in accordance with the present invention.

Here, FIG. 2 shows an example of the noise spectrum. In FIG. 2, FIG. 2(a) shows a noise spectrum at a long distance, and FIG. 2(b) shows a noise spectrum at a short distance. As shown in FIG. 2, at a short distance, there is influence due to the scattered beams of the laser beam within the system, and due to shot noise involved in the reflected beam off the output end surface. Accordingly, the noise spectrum takes high values as compared with those of the spectrum at the long distance, and sometimes takes a further different shape. In the present invention, the signal spectrum is obtained in a controlled state of producing the laser beam, but not emitting it into the air. Thus, it can measure the noise spectrum accurately.

Next, the wind speed measurement using the noise spectrum described above will be described.

In the wind speed measurement by the wind measurement lidar, the light source 1 produces the single-frequency continuous-wave beam (laser beam), first, and the optical distributor 2 splits the laser beam into two parts and delivers them to the pulse modulator 3 and optical coupler 7.

After that, the pulse modulator 3 gives the prescribed frequency shift to the laser beam from the optical distributor 2, and then carries out pulse modulation thereof. The laser beam passing through the pulse modulation by the pulse modulator 3 is output to the optical switch 5 via the optical circulator 4.

After that, in response to the control signal from the outside, the optical switch 5 selects the channel connected to the prescribed optical antenna 6 as the output destination of the laser beam from the pulse modulator 3, and outputs the laser beam to the output destination. Thus, the laser beam is emitted from the optical antenna 6 into a prescribed direction in the air.

The laser beam emitted into the air is scattered by a scatterer like aerosol floating in the air, and a scattered beam is concentrated with the optical antenna 6. Then the scattered beam is delivered to the optical coupler 7 via the optical switch 5 and optical circulator 4.

After that, the optical coupler 7 multiplexes the laser beam from the optical distributor 2 and the beam from the optical switch 5 side via the optical circulator 4 (the scattered beam, and the scattered beams within the system concerning the laser beam and the reflected beam from the output end surface), and outputs to the optical receiver 8. At this time, since the scatterer like the aerosol is carried by the wind, the scattered beam has a Doppler shift frequency corresponding to the wind speed.

After that, the optical receiver 8 carries out heterodyne detection of the beam signal from the optical coupler 7 and converts to the electric signal. At this time, the frequency of the electric signal becomes equal to the Doppler frequency shift corresponding to the wind speed.

After that, the A/D converter 9 carries out the A/D conversion of the received signal from the optical receiver 8, and the FFT device 10 executes the FFT processing of the electric signal to obtain the signal spectrum.

After that, the frequency difference unit 112 of the noise spectral difference device 11 subtracts in the frequency domain the noise spectrum stored in the noise spectrum storage 111 from the signal spectrum delivered from the FFT device 10. The signal spectrum after the noise correction by the frequency difference unit 112 is delivered to the frequency shift analyzer 12.

Figure 3:
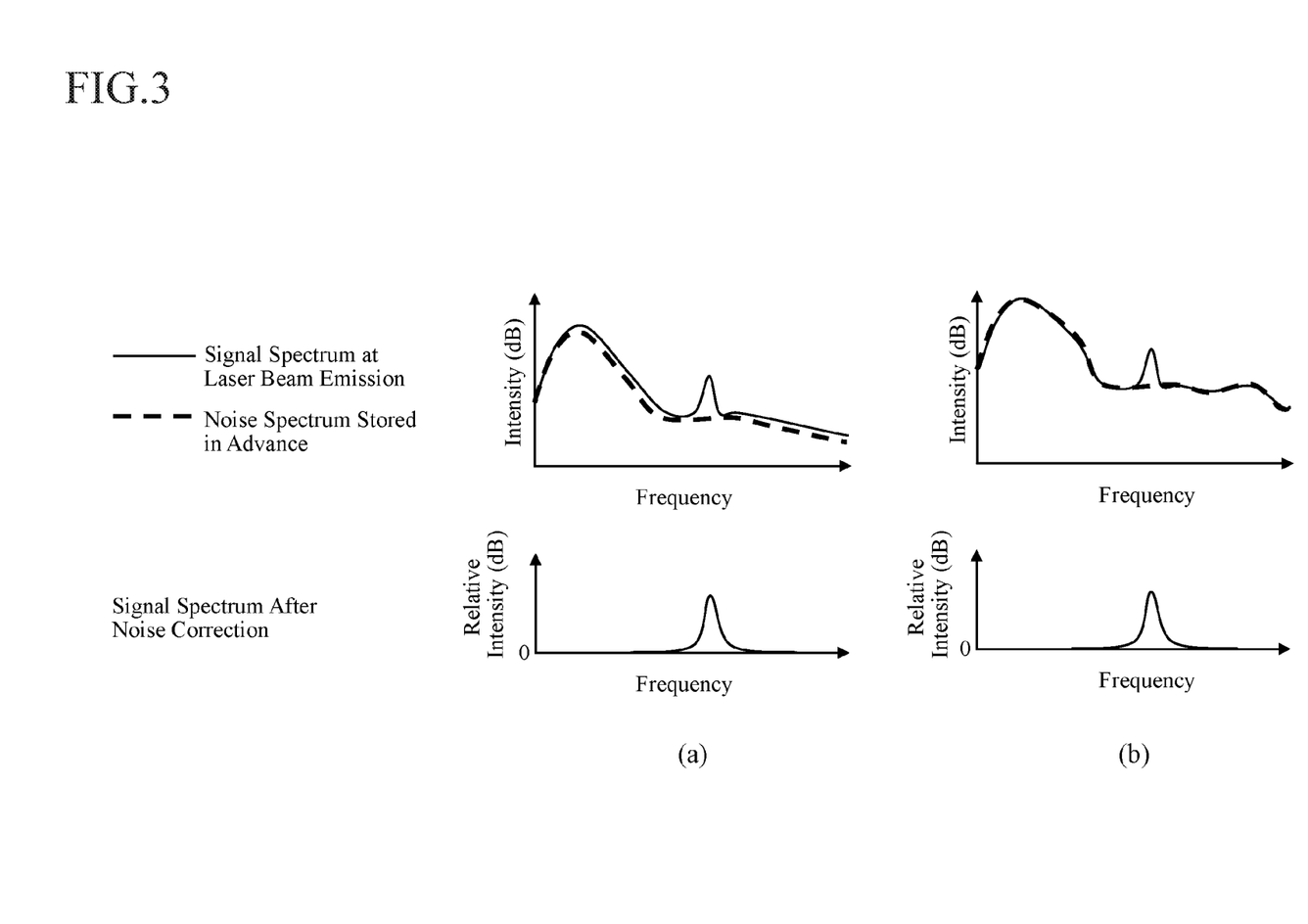
FIG. 3 is a diagram showing an operation of the wind measurement lidar of the embodiment 1 in accordance with the present invention.

Here, FIG. 3 shows an example of the noise spectrum, the signal spectrum obtained when emitting the laser beam into the air, and the signal spectrum after the noise correction. In FIG. 3, FIG. 3(a) shows the spectra at a long distance, and FIG. 3(b) shows the spectra at a short distance. As shown in FIG. 3, when the noise spectral difference device 11 subtracts the noise spectrum from the signal spectrum, the "shape" of the noise spectrum is corrected, and the signal spectrum can be obtained which has an offset superimposed over the relative intensity of 0 dB. Thus, the frequency shift analyzer 12 can calculate the peak frequency position without being affected by the noise level fluctuations in the calculation.

After that, the frequency shift analyzer 12 converts the signal spectrum after the noise correction delivered from the noise spectral difference device 11 to the linear region, calculates the peak frequency by the barycentric operation, and calculates the frequency shift amount. Then, the wind speed processor 13 calculates the wind speed from the frequency shift amount.

Incidentally, a configuration is also possible which comprises an offset correction unit connected to a post-stage of the noise spectral difference device 11 so that the offset correction unit converts the signal spectrum after the noise correction to the linear region and makes the offset correction.

In this case, the offset correction unit passes the signal spectrum, which has been converted to the linear region, through a correlation filter with a shape of the signal spectrum, and calculates an approximate peak frequency position. Then it calculates the offset amount at a frequency position remote enough from the peak frequency position, and subtracts the offset amount from the signal spectrum. Thus, it obtains the signal spectrum passing through the offset correction. Incidentally, when the offset correction unit is added, it is unnecessary for the frequency shift analyzer 12 to convert the signal spectrum to the linear region.

Incidentally, although the foregoing description is made about the configuration in which the pulse modulator 3 provides the prescribed frequency shift to the laser beam from the optical distributor 2 and then conducts the pulse modulation, this is not essential. For example, a configuration is also possible which causes the pulse modulator 3 to carry out only the pulse modulation of the laser beam from the optical distributor 2, and which inserts between the optical distributor 2 and the optical coupler 7 an acoustooptic device or the like for providing the prescribed frequency shift to the laser beam from the optical distributor 2.

As described above, according to the present embodiment 1, it is configured in such a manner as to handle the signal spectrum, which is obtained while controlling the laser beam to be produced, but not to be emitted into the air, as the noise signal. Thus, since it measures the noise level in the on-state of the laser radiation, and hence it can carry out the noise correction including the shot noise effect due to the laser beam, thereby being able to achieve the wind speed measurement without a correction error.

Figure 4:
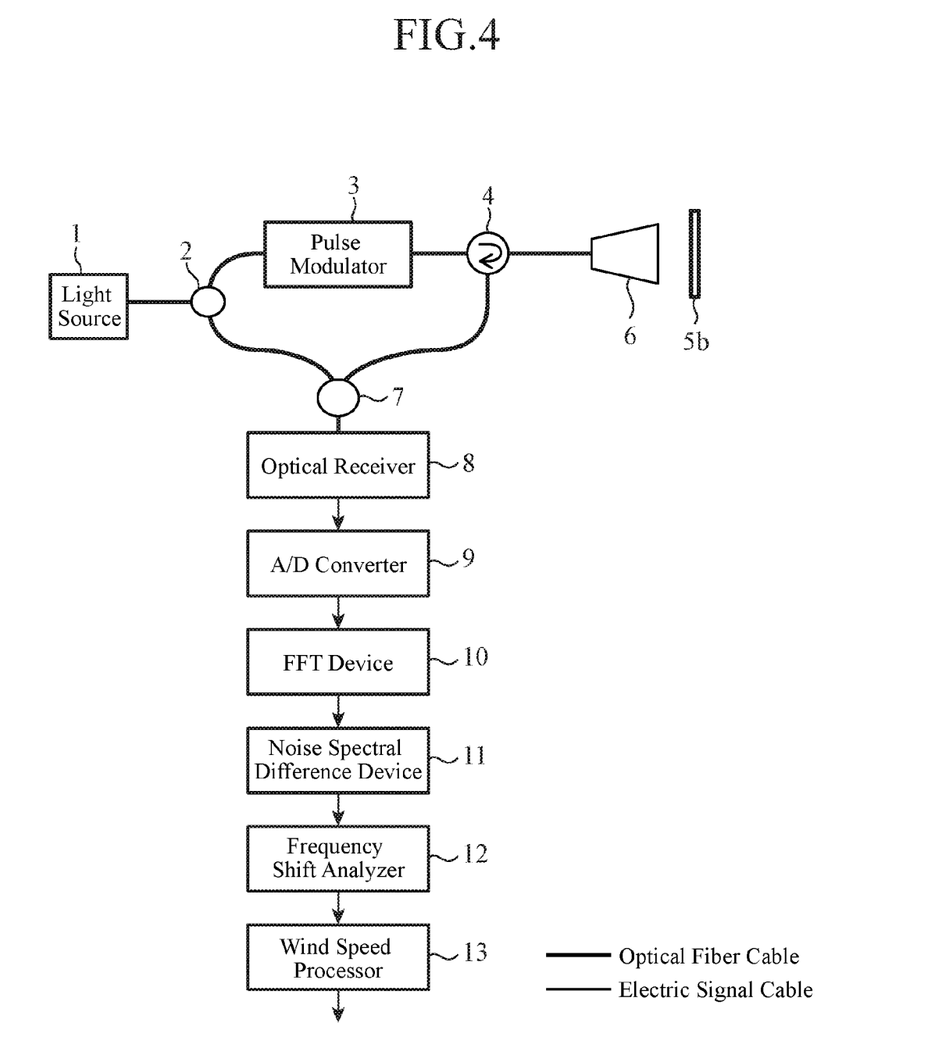
FIG. 4 is a block diagram showing another configuration of the wind measurement lidar of the embodiment 1 in accordance with the present invention.
Figure 5:
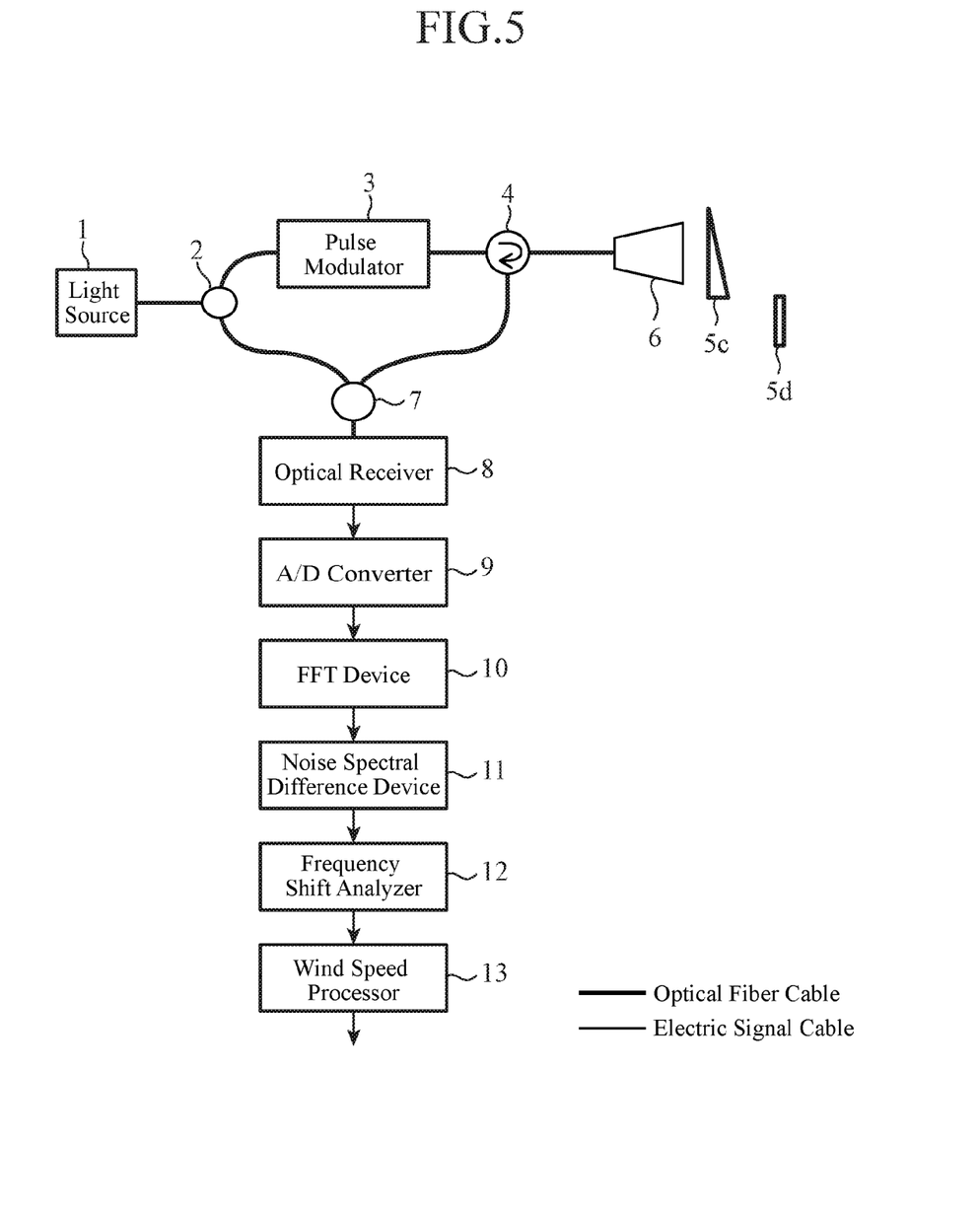
FIG. 5 is a block diagram showing still another configuration of the wind measurement lidar of the embodiment 1 in accordance with the present invention.

In addition, although FIG. 1 shows a configuration using the optical switch 5 as the controller of the wind measurement lidar in accordance with the present invention, this is not essential. For example, a configuration shown in FIG. 4 or FIG. 5 is also possible. FIG. 4 shows a configuration which uses a shutter 5b as the controller, and screens the laser beam with the shutter 5b when obtaining a noise spectrum. FIG. 5 shows a configuration that uses a scanner 5c and a shield 5d as the controller, that covers, when the scanner 5c scans the laser beam, one direction with the shield 5d, and that obtains the noise spectrum in the portion covered with the shield 5d.

Embodiment 2

Figure 6:
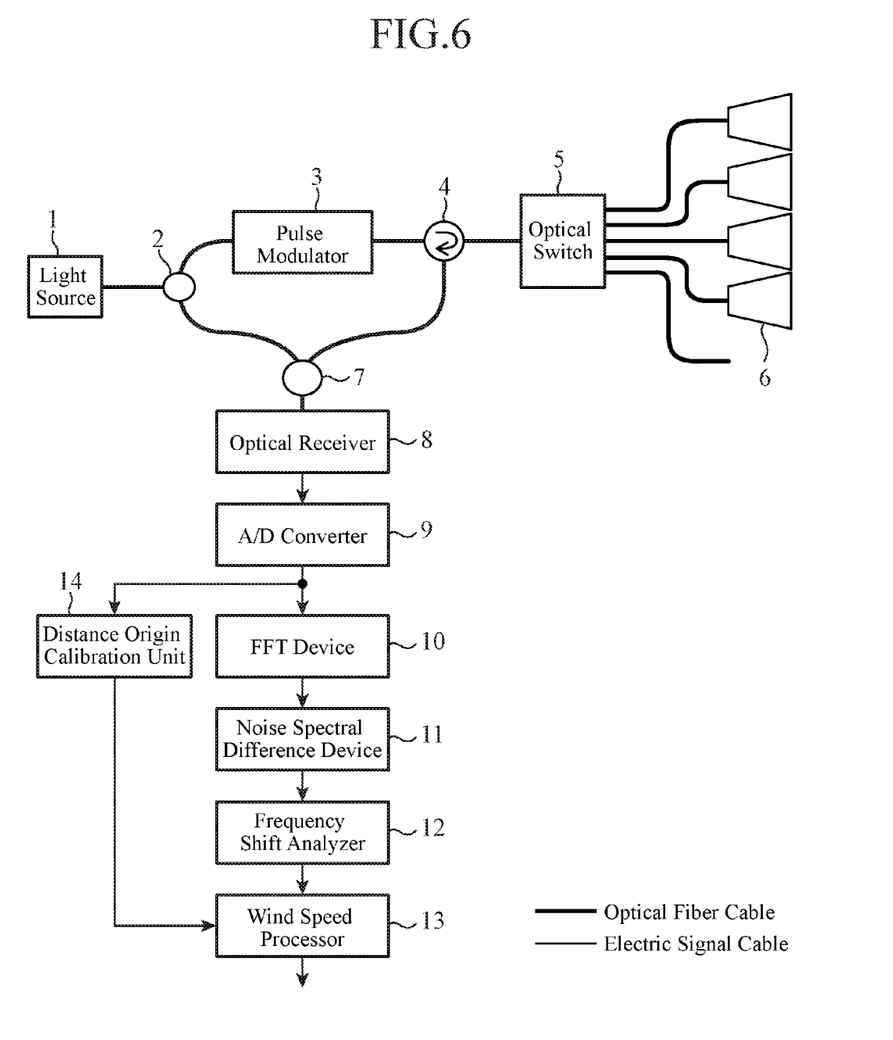
FIG. 6 is a block diagram showing a configuration of a wind measurement lidar of an embodiment 2 in accordance with the present invention.

FIG. 6 is a block diagram showing a configuration of a wind measurement lidar of an embodiment 2 in accordance with the present invention. The wind measurement lidar of the embodiment 2 shown in FIG. 6 comprises, in addition to the wind measurement lidar of the embodiment 1 shown in FIG. 1, a distance origin calibration unit 14. As for the other components, since they are the same, their description will be omitted by designating them by the same reference numerals.

Incidentally, in FIG. 6, an electric circuit like an electric signal cable connects between the A/D converter 9 and the distance origin calibration unit 14, and between the distance origin calibration unit 14 and the wind speed processor 13.

Figure 7:
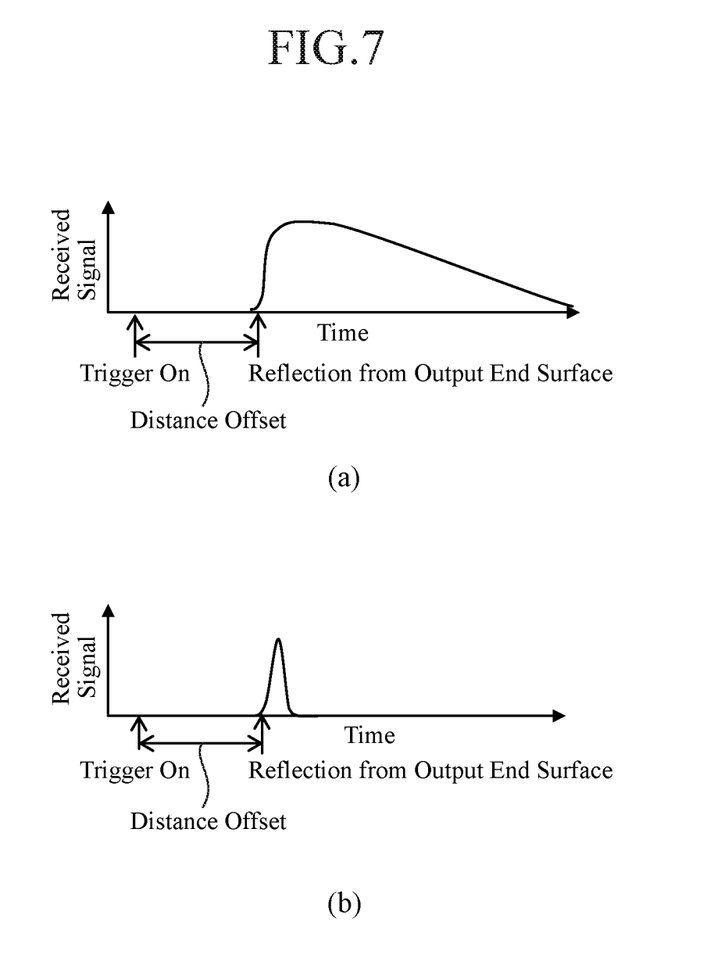
FIG. 7 is a diagram showing an operation of the wind measurement lidar of the embodiment 2 in accordance with the present invention.

The distance origin calibration unit 14 is a component to calibrate, when the optical switch 5 selects the channel not connected to any of the optical antennas 6 as the output destination of the laser beam, the electric signal acquired by the A/D converter 9 as the distance origin. Here, as for the distance value, it generally uses the control signal input to the pulse modulator 3 as its trigger signal. In contrast with this, as shown in FIG. 7, the distance origin calibration unit 14 outputs an offset signal with respect to the trigger signal to the wind speed processor 13 so as to use, as the distance origin, the signal from the output end surface of the channel not connected to any of the optical antennas 6.

Thus, according to the frequency shift amount from the frequency shift analyzer 12, the wind speed processor 13 calculates the wind speed value with respect to the distance origin calibrated by the distance origin calibration unit 14.

Incidentally, the distance origin calibration unit 14 corresponds to "a distance origin calibrator to calibrate, when the laser beam is controlled by the controller so as to be produced, but not to be emitted into the air, the received signal obtained by the received signal acquiring unit as a distance origin" in accordance with the present invention.

As described above, according to the present embodiment 2, it is configured in such a manner as to calibrate the electric signal, which is acquired while controlling the laser beam so as to be produced, but not to be emitted into the air, as the distance origin, and to measure the wind speed with respect to the distance origin. Accordingly, it can automatically correct the optical path length after constructing the apparatus. In addition, it can automatically correct the optical path length even if it varies because of the temperature or the like.

Incidentally, although FIG. 6 shows a configuration of the wind measurement lidar that uses the optical switch 5 as the controller, this is not essential. For example, a configuration is also possible which adds the distance origin calibration unit 14 to the configuration shown in FIG. 4 using the shutter 5b as the controller or to the configuration shown in FIG. 5 using the scanner 5c and shield 5d as the controller.

Embodiment 3

Figure 8:
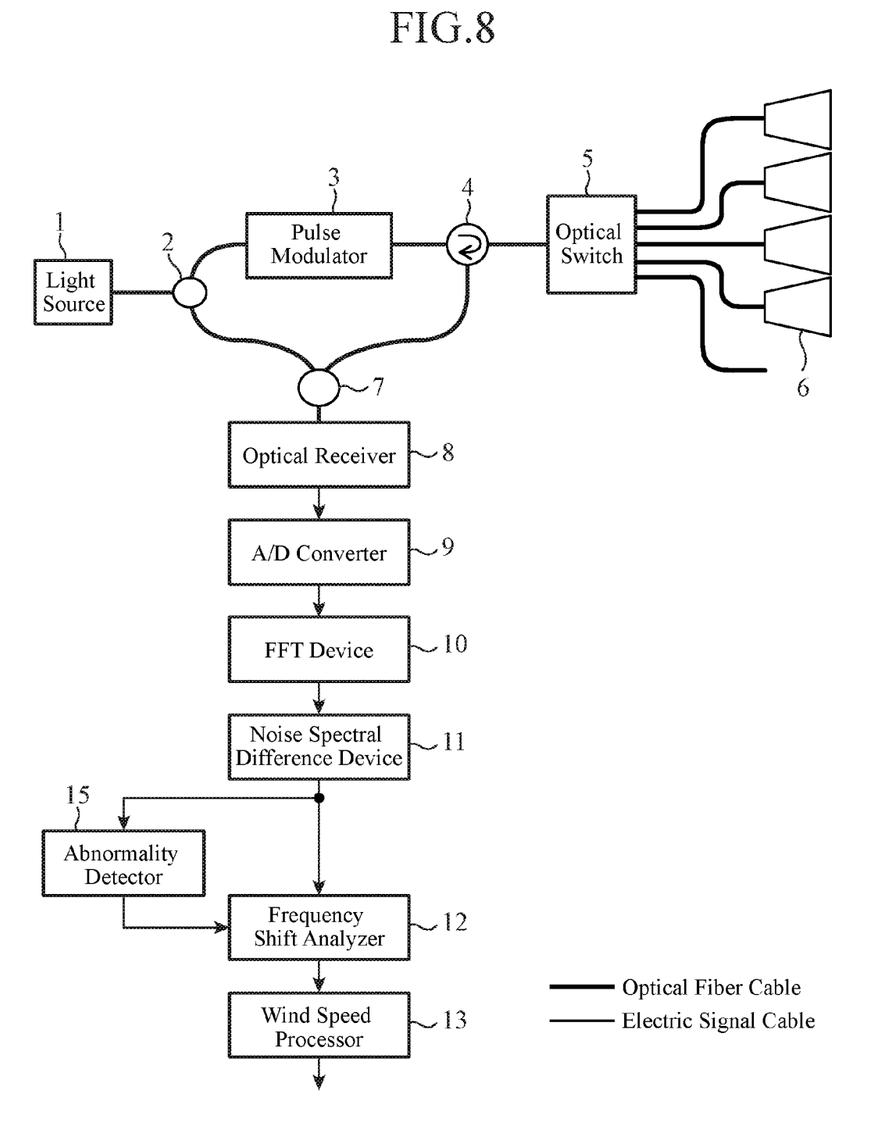
FIG. 8 is a block diagram showing a configuration of a wind measurement lidar of an embodiment 3 in accordance with the present invention.

FIG. 8 is a block diagram showing a configuration of a wind measurement lidar of an embodiment 3 in accordance with the present invention. The wind measurement lidar of the embodiment 3 shown in FIG. 8 comprises, in addition to the wind measurement lidar of the embodiment 1 shown in FIG. 1, an abnormality detector 15. As for the other components, since they are the same, their description will be omitted by designating them by the same reference numerals.

Incidentally, in FIG. 8, an electric circuit like an electric signal cable connects between the noise spectral difference device 11 and the abnormality detector 15, and between the abnormality detector 15 and the frequency shift analyzer 12.

Figure 9:
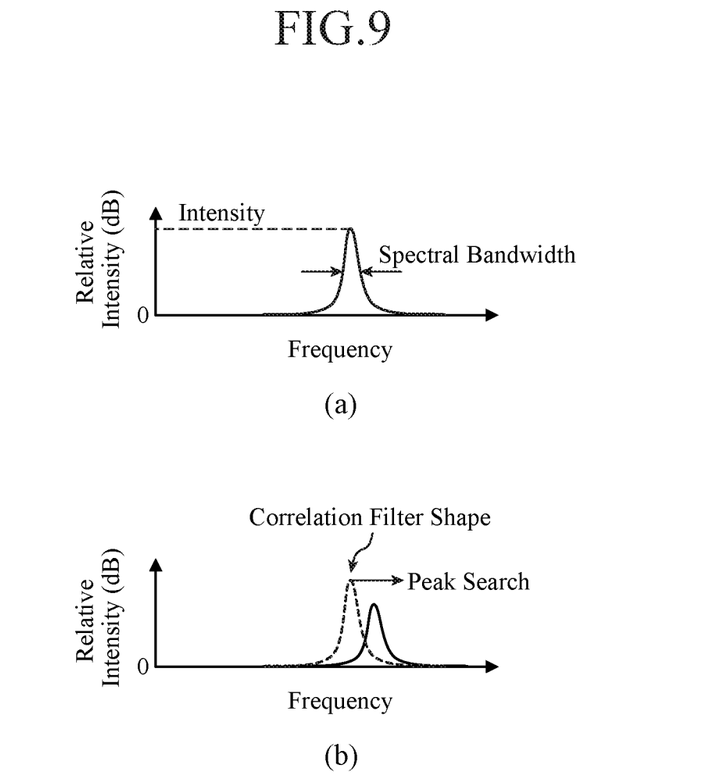
FIG. 9 is a diagram showing an operation of the wind measurement lidar of the embodiment 3 in accordance with the present invention.

The abnormality detector 15 is a component to carry out abnormality detection or to decide the validity of the received signal at a time of receiving a scattered beam of a laser beam by monitoring the transmission power and spectrum (spectral bandwidth) of the laser beam from the signal spectrum obtained by the noise spectral difference device 11 when the optical switch 5 selects the channel not connected to any of the optical antennas 6 as the output destination of the laser beam as shown in FIG. 9. In addition, when it decides that the received signal is valid, it retains the spectral bandwidth and outputs it to the frequency shift analyzer 12.

Incidentally, FIG. 9(b) is a diagram showing an example of a confirmation method of the spectral bandwidth. In FIG. 9(b), the abnormality detector 15 detects a peak frequency by a peak search using a correlation filter, and detects the spectral bandwidth using a barycentric operation or fitting.

For example, as for the abnormality of the transmission power, a power reduction of the light source 1 can be supposed, and as for the abnormality of the spectral bandwidth, a power reduction of the light source 1 or noise mixing can be supposed. With regard to the wind measurement, these abnormalities can affect a received SN ratio and frequency shift measurement accuracy, and thus can affect the wind speed measurement accuracy. Accordingly, detecting these abnormalities at an early stage makes it possible to take an early measure such as part replacement to keep valid data ratio in a long term measurement.

When the abnormality detector 15 detects an abnormality, the frequency shift analyzer 12 does not execute the processing of the received signal corresponding to the laser beam, but outputs an abnormality value for informing an observer about the abnormality.

Incidentally, the abnormality detector 15 corresponds to "an abnormality detector to monitor, when the laser beam is controlled by the controller so as to be produced, but not to be emitted into the air, transmission power and a spectrum of the laser beam from the received signal obtained by the received signal acquiring unit, and to carry out abnormality detection or to make a decision of validity of the received signal from the laser beam" in accordance with the present invention.

As described above, according to the present embodiment 3, it is configured in such a manner as to monitor the transmission power and spectrum of the laser beam from the received signal obtained while controlling the laser beam so as to be produced, but not to be emitted into the air, and to make the abnormality detection or to decide the validity of the received signal from the laser beam. Accordingly, it can decide the validity of the acquired data by analyzing the peak value of the reflected beam of the laser beam from the output end surface. In addition, analyzing the foregoing data makes it possible to carry out the abnormality detection of the light source 1 and the various optical components.

Incidentally, although FIG. 8 shows a configuration of the wind measurement lidar that uses the optical switch 5 as the controller, this is not essential. For example, a configuration is also possible which adds the abnormality detector 15 to the configuration shown in FIG. 4 using the shutter 5b as the controller or to the configuration shown in FIG. 5 using the scanner 5c and shield 5d as the controller.

In addition, although examples using the optical fibers as an optical circuit are shown in the wind measurement lidars of the embodiments 1-3, the optical circuit can be comprised of an optical circuit using space propagation.

Incidentally, it is to be understood that a free combination of the individual embodiments, variations of any components of the individual embodiments or removal of any components of the individual embodiments is possible within the scope of the present invention.

INDUSTRIAL APPLICABILITY

The wind measurement lidar in accordance with the present invention is capable of making the noise correction including the shot noise effect due to the laser beam, and is able to conduct wind speed measurement without a correction error. Accordingly, it is suitable for an application to a wind measurement lidar and the like.

DESCRIPTION OF REFERENCE SYMBOLS 1 light source; 2 optical distributor; 3 pulse modulator; 4 optical circulator; 5 optical switch; 5b shutter; 5c scanner; 5d shield; 6 optical antenna; 7 optical coupler; 8 optical receiver; 9 analog-to-digital converter (A/D converter); 10 fast Fourier analyzer (FFT device); 11 noise spectral difference device; 12 frequency shift analyzer; 13 wind speed processor; 14 distance origin calibration unit; 15 abnormality detector; 111 noise spectrum storage; 112 frequency difference unit.

What is claimed is:
1. A wind measurement lidar comprising:
an output unit to produce a laser beam;
a transmitter-receiver to emit the laser beam produced by the output unit into the air, and to receive a scattered beam of the laser beam;
a received signal acquirer to obtain a received signal through heterodyne detection of the laser beam produced from the output unit and a beam acquired via the transmitter-receiver;
a controller to control the transmitter-receiver;
a storage to store, when the laser beam is controlled by the controller so as to be produced, but not to be emitted into the air, the received signal obtained by the received signal acquirer as a noise signal;
a frequency difference unit to subtract in a frequency domain the noise signal stored in the storage from the received signal obtained by the received signal acquirer when the laser beam is controlled by the controller so as to be emitted into the air;

a wind speed measurer to measure a wind speed from a subtraction result by the frequency difference unit; and a distance origin calibrator to calibrate, when the laser beam is controlled by the controller so as to be produced, but not to be emitted into the air, the received signal obtained by the received signal acquirer as a distance origin, wherein the wind speed measurer measures the wind speed with regard to the distance origin calibrated by the distance origin calibrator.

2. A wind measurement lidar comprising:

an output unit to produce a laser beam;

a transmitter-receiver to emit the laser beam produced by the output unit into the air, and to receive a scattered beam of the laser beam;

a received signal acquirer to obtain a received signal through heterodyne detection of the laser beam produced from the output unit and a beam acquired via the transmitter-receiver;

a controller to control the transmitter-receiver;

a storage to store, when the laser beam is controlled by the controller so as to be produced, but not to be emitted into the air, the received signal obtained by the received signal acquirer as a noise signal;

a frequency difference unit to subtract in a frequency domain the noise signal stored in the storage from the received signal obtained by the received signal acquirer when the laser beam is controlled by the controller so as to be emitted into the air;

a wind speed measurer to measure a wind speed from a subtraction result by the frequency difference unit; and an abnormality detector to monitor, when the laser beam is controlled by the controller so as to be produced, but not to be emitted into the air, transmission power and a spectrum of the laser beam from the received signal obtained by the received signal acquirer, and to carry out abnormality detection or to make a decision of validity of the received signal from the laser beam.

\* \* \* \* \*